May 27, 1958  E. F. MacNICHOL, JR., ET AL  2,836,810
RANGE UNIT
Filed July 10, 1945  2 Sheets-Sheet 1

INVENTORS
EDWARD F. MACNICHOL JR.
CLARENCE M. CONNELLY
JOB ROBERT ROGERS

BY
ATTORNEY

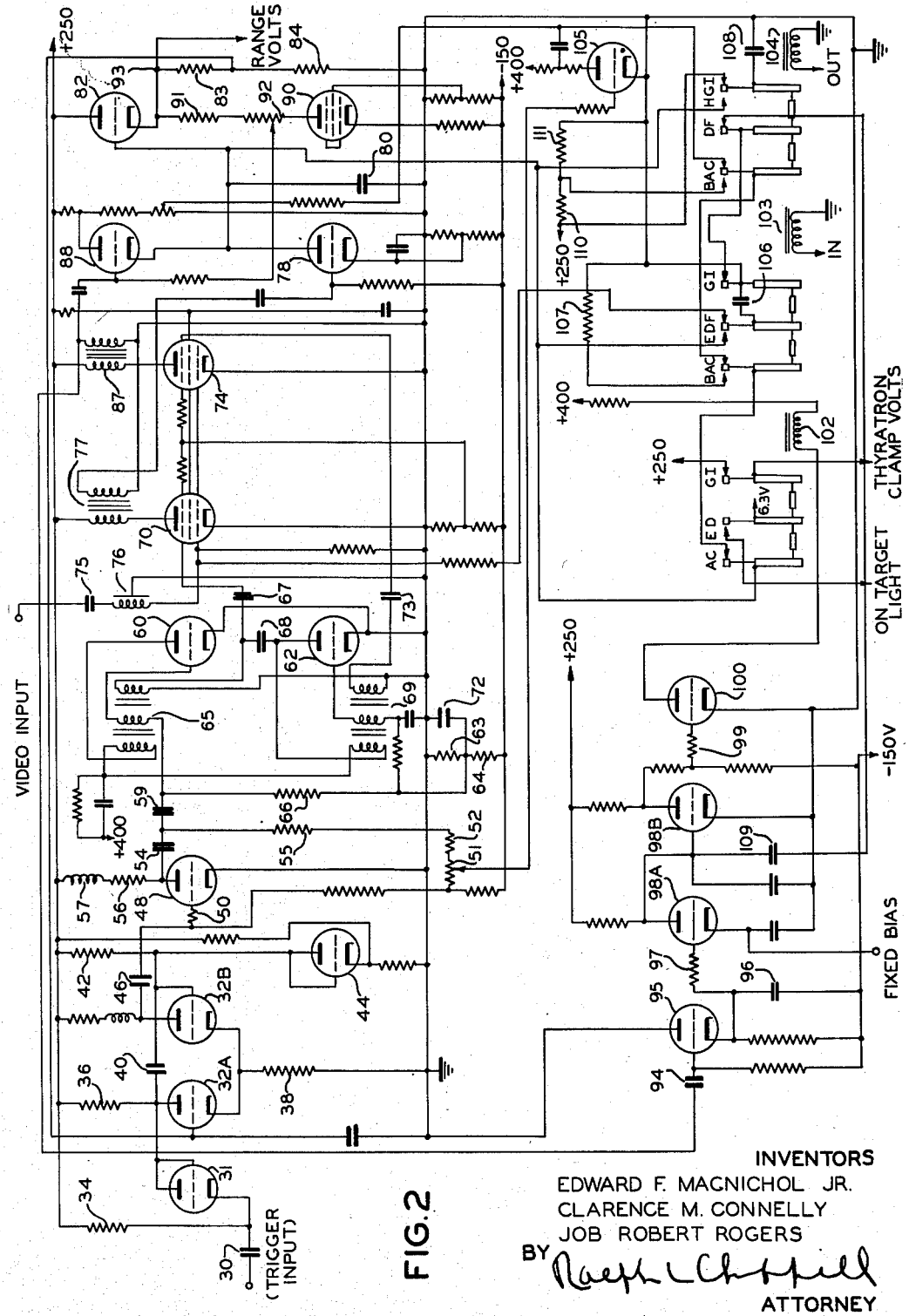

United States Patent Office 2,836,810
Patented May 27, 1958

2,836,810

RANGE UNIT

Edward F. MacNichol, Jr., Hamilton, Clarence M. Connelly, Belmont, and Job Robert Rogers, Cambridge, Mass., assignors, by mesne assignments, to the United States of America as represented by the Secretary of the Navy Application July 10, 1945, Serial No. 604,270

12 Claims. (Cl. 343—7.3)

This invention relates to radio echo detection systems and in particular to a system of high frequency electrical circuits which measures the elapsed time between a transmitted pulse and a returning echo signal which the unit itself selects automatically for consideration and which it maintains in view by automatic tracking of an echo target of varying range. Such systems are often referred to as "range units." The measurement of this elapsed time which is proportional to the range of the target appears in the form of a voltage which is also directly proportional to the range of the particular target. The range information in the form of voltage so obtained may be used for the multiplicity of purposes in connection with aircraft fire control or warning. Among the features of the invention are included a provision for automatic searching in range from zero to maximum range, and also a provision for disconnecting the automatic search when a target is detected, and finally a manual control for choosing targets if desired. Other incidental features will be noted in the detailed description to follow.

It is the principal object of this invention to provide an electrical system which converts a low powered radio frequency transmit-receive system into an automatic range finder for aircraft fire control.

Incidental to the principal object it is an object of this invention to provide an electrical system which will produce an output voltage whose magnitude is directly proportional to the range of a selected target.

Another object is to provide an electrical system which will automatically track a signal corresponding to a particular target.

It is also an object to provide an electrical system which will automatically search the range of the associated radio echo detection equipment from zero to maximum range for targets and which will then track the first target so detected.

A further object is to provide an electrical system which will disconnect the search circuits when a target is detected.

Another object is to provide a device by which the automatic searching and tracking may be momentarily superseded and targets may be chosen by manual operation for further tracking.

Other objects and features will be found in the detailed specification below when taken with the accompanying drawing and diagrams.

Fig. 2 is a circuit diagram of a particular range unit, which utilizes the triggers and echo signals of a radio echo detection equipment to automatically select and track a target and produce an output voltage of magnitude proportional to the range of the chosen target, and also a disconnecting of search circuit and a manual target selector circuit.

Figure 1:
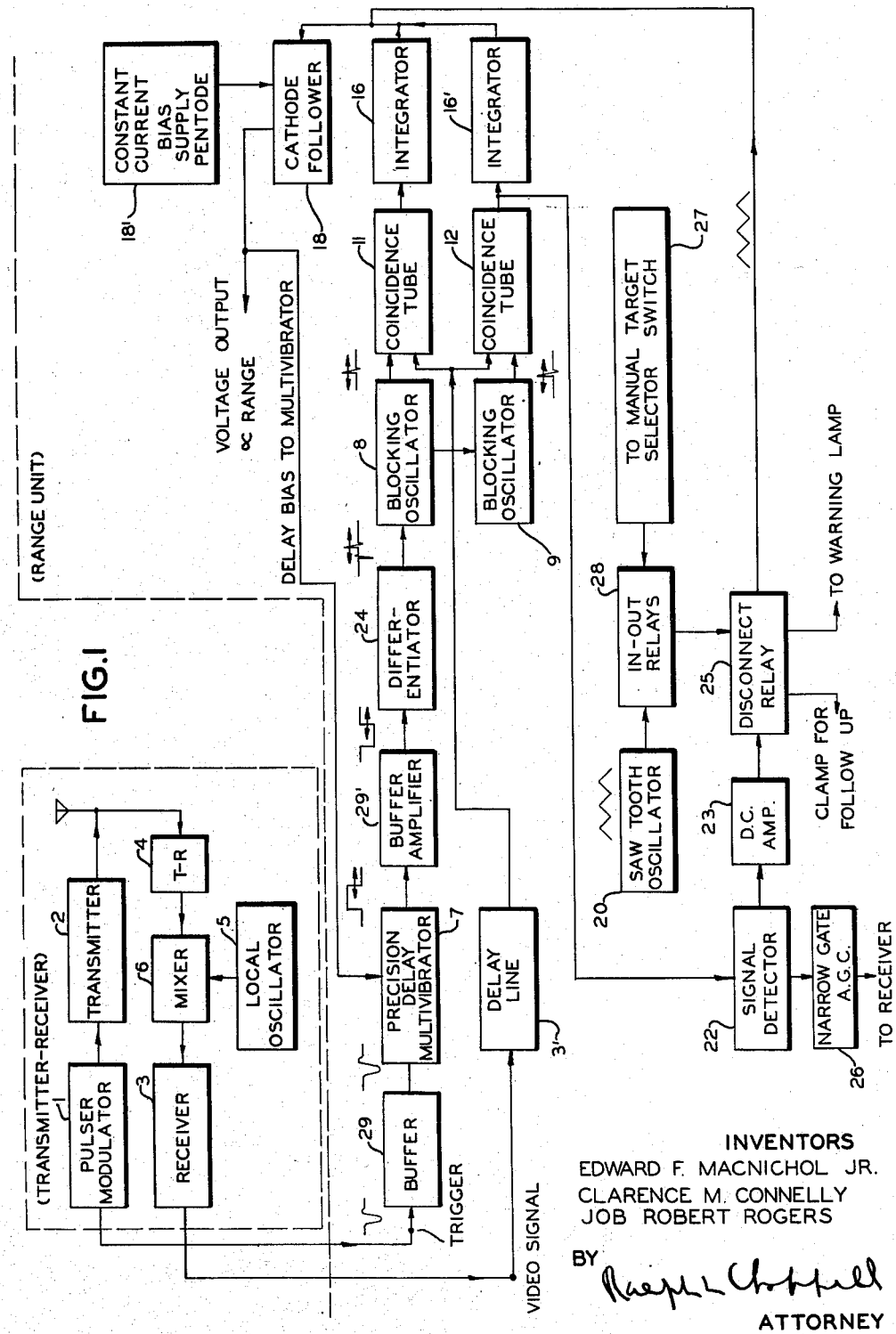
Fig. 1 is a block diagram of an automatic range system in accordance with the principles of this invention including a typical low power radio echo transmitter-receiver system with which the range unit might be associated.

Referring now to the block diagram Fig. 1 there is shown a typical radio echo detection transmit-receive system which provides to the range unit the synchronizing trigger and the video signals necessary to the operation of the range system, and includes a modulator 1, a transmitter 2, a receiver 3, with a T-R box 4, local oscillator 5 and mixer 6 associated therewith. The principal object however of this block diagram is to show the components and their relations in the range unit.

Automatic range tracking is accomplished as follows. A voltage sensitive precision delay multivibrator or other voltage controlled delay device 7 activated by a trigger from modulator 1 displaces in time two short pulses or narrow gates generated by two blocking oscillators 8 and 9 triggered by a positive output pip from a differentiator 24. These short pulses or narrow gates are displaced from one another by a fixed interval equal to the width of one pulse so that the second pulse starts immediately after the first one stops. The two narrow pulses are applied positively to remove a negative bias from the suppressor grids of two coincidence pentode tubes 11 and 12 allowing current to flow for the duration of the pulse. Also video signals are supplied from the receiver 3 through a delay line 3' to the control grids of these tubes 11 and 12. If there is a coincidence between a video signal and a gate pulse, a large current flows. If there is not such a coincidence a very small plate current flows. No plate current at all flows except during the gate pulse. The resultant two pulses due to a coincidence are inverted to make them positive, and are applied then to the grids of two integrator tubes 16 and 16'. Pulses on one grid cause an increase in the net integrator circuit output voltage and on the other a decrease. Since the widths of the resultant pulses on the respective plates of the coincidence tubes 11 and 12 and hence the widths on the two respective integrator circuit grids are proportional to the overlap between signal and each gate the output potential rises or falls depending on the relative location of the video signal to the two adjacent gates. If most of the signal is during the early gate the potential drops but if most of the signal is during the late gate the potential rises. If the signal is equally divided between the two gates the potential will not change. If the signal level falls to zero, the potential likewise will not change because the charge on the integrator condenser cannot leak off. Thus when a signal is being properly tracked it will appear midway between the two gates.

The output voltage of the integrator circuit 16 and 16' controls the operation of a cathode follower tube 18, whose corresponding output voltage is suitably divided and fed back to the grid of the delay multivibrator 7. The gain around this loop is very high so that the gates are accurately positioned to the signal. As there are negligible delays in the circuit there is no tendency to oscillate. Since the pulse width of the delay multivibrator is a linear function of grid bias, the bias necessary to hold it at a width which centers the gates on the signal is used as a measure of range. It is only necessary to insert a voltmeter in series with a fixed zeroing voltage between the grid of the delay multivibrator and ground. The fixed voltage is adjusted to cause the meter to read zero at zero range and a resistance in series with the meter is adjusted to spread the range over the meter scale. The delay multivibrator characteristic has proved linear within better than 0.5% from a minimum width of 3 microseconds to a maximum width determined by the choice of the time constant.

To allow the gates to come in to zero range a fixed video delay line 3' is used to delay all return echoes from the receiver by 3.7 microseconds. This delay line 3' is of the distributed parameter type and introduces negligible distortion for pulses from receivers having less than three megacycles overall bandwidth.

Also indicated in Fig. 1 are the components which provide automatic range search. The potential at the output of the integrator circuit 16 and 16' is caused to vary by a gas tube relaxation oscillator 20 which applies a one second saw-tooth wave thus causing the gates to scan out and back over the whole range. If a signal, even very small, appears in the gate of coincidence circuit 12 it will conduct causing variations of voltage in a signal detecting circuit 22. These variations are amplified by a D. C. amplifier 23 used to activate a relay 25 which cuts off the application to the integrator circuits 16 and 16' and hence to delay multivibrator 7, of the saw-tooth search voltage, and thus allows the signal to take control of the tracking circuits without delay, and may also be used to render inoperative (except when a signal is being tracked) a follow-up servo mechanism which may be associated with the range unit for converting its range proportional output voltage into a mechanical shaft rotation proportional to the target range. Also, when a signal is detected the relay 25 may be used to provide voltage for visual or audible warning indications. When a detected signal is lost the sweep will resume after a delay time in the disconnect circuit 22 chosen suitably long as to take care of fading or other momentary interruptions. If the range unit is tracking an undesired target e. g. a friendly aircraft, a manual control circuit 27 operating an "in" and "out" relay 28 may be employed to cause the gates to sweep out or in according to choice and automatically stop on the next target and this process may be repeated if desired in either direction. A power supply (not shown) provides voltages indicated in Fig. 2 as +400, +250, and −150, however, other suitable potential levels could equally well be employed. Buffer stages 29 and 29' are employed to isolate the precision delay multivibrator 7. Also operated by the signal detector circuit 22 is a narrow gated automatic gain control circuit 26 the output of which is fed back to the associated receiver 3 to maintain a constant amplitude of the particular signal being tracked. There is indicated by block 18' a pentode which provides a "floating" source of constant bias for the cathode follower 18.

A more detailed and complete circuit diagram of a particular embodiment of a range unit appears in Fig. 2.

A negative pulse of about 100 volts and 0.7 microsecond duration is fed through a condenser 30 to a diode connected tube 31 acting as a buffer to prevent any reaction from a subsequent multivibrator circuit having tubes 32A and 32B coming back to the trigger source and also prevents any positive overshoot of the incoming trigger pulse from affecting the multivibrator action. The potential of the cathode of tube 31 is determined by resistor 34 and the potential of the plate by resistor 36.

The multivibrator is of the start-stop or delay type with one tube 32B normally conducting and another tube 32A normally non-conducting. The cathodes are directly coupled and the bias produced by tube 32B across resistor 38 keeps tube 32A cut off so long as no signal is applied to tube 32A. Upon application of the negative trigger pulse, the grid of tube 32B is driven down beyond cut off. The bias voltage developed in resistor 38 is lowered and allows tube 32A to begin conducting. Thus the voltage at the plate of tube 32A drops and holds the grid of tube 32B negative. Likewise the voltage on the plate of tube 32B rises quickly and remains up as long as the grid is maintained beyond cut off. The grid remains below cut off until condenser 40 charges up sufficiently through resistor 42.

A clamping diode connected tube 44 fixes the quiescent voltage at the grid of tube 32B thus furnishing the reference point for the operation of the multivibrator circuit.

When condenser 40 is charged up, tube 32B again becomes conducting and its plate voltage drop across resistor 38 is now sufficient to bias tube 32A beyond cut off again and this condition remains until the next negative trigger pulse arrives. The length of time involved before the plate voltage of tube 32B returns to its normal or quiescent value is dependent upon the time constant of condenser 40 and resistor 42 and also upon the potential at the grid of tube 32A (and thus upon how high the cathodes must rise before tube 32A is cut off).

This multivibrator furnishes a positive square wave the length of which in terms of yards can be varied by changing the potential applied to the grid of tube 32A. The variation in length of the square wave pulse is linear with respect to this range voltage applied to the grid.

This square wave output, taken from plate of tube 32B is fed through a condenser 46 to the grid of a buffer amplifier tube 48. Resistor 50 is a current limiter. Tube 48 is normally biased to cut off, obtaining its bias at the junction of resistors 51 and 52. Tube 48 amplifies and inverts the square wave and feeds the output to a differentiating circuit consisting of condenser 54 and resistor 55. Resistor 56 is a plate load resistor and inductance element 57 is a choke inserted to maintain high impedance for high frequency components of the square wave and thus to maintain steep fronts.

The differentiating circuit 54, 55 differentiates this negative square wave giving a negative pip followed by a positive pip, the positive pip coinciding in time with the trailing edge of the square wave output from the multivibrator 32B. Therefore the position of this pip is a function of the voltage applied to the grid of tube 32A.

The output pips are fed through a coupling condenser 59 to the grid of a blocking oscillator tube 60. This tube operates as a blocking oscillator normally cut off by negative bias voltage obtained from the bias network of resistors 63 and 64. The negative pip produced by the square wave leading edge has no effect because the grid of tube 60 is already cut off. The positive pip, however, causes plate current to flow. A three winding iron core transformer 65 in conjunction with tube 60 functions as a very closely coupled feedback oscillator. When plate current starts a positive voltage is fed back to the grid which causes a regenerative increase in plate current which continues until condenser 59 stops charging. The regenerative action then reverses and the tube is cut off. A pulse of about 0.4 microsecond is produced in the third winding. The third winding of transformer 65 is the output winding which feeds this very short pulse through a coupling condenser 67 to the coincidence tube. A portion of the output of this winding is also fed through a coupling condenser 68 to the late gate transformer 69. Transformer 69 is connected so that the input to the grid of tube 62 is inverted in phase with respect to the signal fed to the first coincidence tube 70. Therefore, the negative overshoot from the output winding of transformer 65 becomes positive on the grid of the late gate tube 62. The late gate operates in the same manner as the early gate except that its output with respect to time takes place at the end of the early gate. 72 is a by-pass capacitor. The output of transformer 69 is fed through a condenser 73 to the coincidence tube 74. The outputs of the early and late gates thus give two narrow positive pulses very close together, and the first pulse is coincident with the trailing edge of the square wave output from the multivibrator 32.

The coincidence circuit uses two tubes 70 and 74. These tubes are biased beyond cut-off and conduct only when signals are applied to both the suppressor grid and control grid simultaneously. The outputs of the early and late gates are connected to the suppressors of tubes 70 and 74 respectively and remove the negative bias on these grids. The video input from a receiver such as 3 of Fig. 1 is fed to the two control grids simultaneously, through a coupling capacitor 75, to a delay line 76, and thus to the two control grids of tubes 70 and 74. The delay line 76 is necessary to delay all video signals by about 4 microseconds because the multivibrator, 32, does not become linear for approximately 2 to 3 microseconds.

The inclusion of the delay line 76, therefore, enables the gates to come in to zero range. If the video signal coincides in time with either the early gate pulse or late gate pulse, a large plate current pulse flows in either tube 70 or 74 depending upon which gate coincides with the signal. Let us assume that the signal coincides with the early gate. Tube 70 will conduct heavily and feed a negative signal to a transformer 77.

Transformer 77 inverts this signal and applies the resulting positive signal to the grid of tube 78 which is one-half of the integrator circuit. This causes tube 78 to conduct and electrons flow to the top plate of a condenser 80 through the tube 78, and thus lower the potential on condenser 80 which is the integrator capacitor.

This potential is applied to the grid of tube 82, a cathode follower, causing the potential to drop in its cathode. The junction of the cathode resistors, 83 and 84, is fed back to the grid of multivibrator 32. These resistors 83 and 84 form a voltage divider which reduces the range voltage to a value suitable for the multivibrator grid. The lowering of voltage on the grid of tube 32A shortens the square wave output of the multivibrator and therefore, pulls the two gate pulses back in range so that the video signal overlaps equally both the early and late gate.

In the event that the video signal coincides with the late gate, tube 74 conducts heavily and furnishes through transformer 87 a positive pulse to the grid of tube 88. This causes tube 88 to conduit and raises the potential on condenser 80 (electrons flow from the top plate of condenser 80 through tube 88). In turn, this raises the potential at the cathode of tube 82 and therefore increases the potential on the grid of 32A. This results in a lengthening of square wave output of the multivibrator so that the two gate pulses move out in range until the video pulse coincides equally with the two gate pulses. Incorporated in the cathode circuit of tube 82 is a constant current pentode, 90. When the plate voltage on the pentode 90 changes, it effectively changes its internal resistance so that the current remains constant. The bias on tube 88 is obtained from the fixed drop across part of resistors 91 and 92 and the fixed drop from cathode to grid of tube 82. The incorporation of tube 90 allows the grid of tube 82 to vary in potential in the same way as its cathode does so that the relative bias between grid and cathode remains constant as range is changed. Resistor 92 is a variable control and can be used to determine the point of balance between the video signal and the two gates. In practice, this control, the integrator balance control, is set so that balance is obtained when the signal overlaps for the most part the early gate. This allows for more positive tracking action in the direction of decreasing range which is usually operationally desirable. This completes description of the tracking function.

To summarize, the magnitude of the pulses on the grids of the integrator tube 82 is proportional to the amount of overlap between the video signal and the gate pulses. The amount of charge which is added to or removed from condenser 80 is proportional to this overlap. Hence, if most of the signal is in the early gate, the potential of the capacitor will drop, if most of the signal is in late gate, the potential will rise, and if the signal is balanced between the gates, the potential will not change. This potential, when applied to the cathode follower, causes the grid of 32A to follow linearly the changes in potential on condenser 80. The pulse width of the delay multivibrator 32 is a linear function of the voltage applied to the grid of 32A. Thus the output of tube 82, the cathode follower, in volts, at point marked 93 is linear with respect to range.

The disconnect portion of the range unit receives its source of signal from the output of one of the coincidence tubes 74, only when the range unit is locked on a target signal. A positive signal is derived from the coincidence circuit and is fed through a coupling capacitor 94, to the grid of a detector tube 95. This tube is operated as an infinite impedance (peak) detector. Condenser 96 by-passes the high frequency components in the detector output. As signal pulses are received from the coincidence circuit the potential of the cathode of 95 rises to a value dependent upon the peak magnitude of the pulse applied to its grid and falls very slowly. This cathode voltage is then applied through a current limiting resistor 97, to the grid of tube 98A which is the first stage of a two stage D. C. amplifier. The cathode of 98A is connected to a potentiometer (not shown) which controls the cut-off point of this stage by varying the amount of bias applied between cathode and grid. This determines the minimum amplitude of coincidence signal to which the disconnect portion of the range unit will respond. The output of 98A is direct-coupled to 98B, the second stage of the D. C. amplifier. The positive signal from 98B is fed through a current limiting resistor 99 to the grid of a "disconnect" tube 100. With no signal input the grid of 100 is biased to cut-off by the voltage from a divider network. During the coincidence the voltage level on the grid of tube 100 rises due to the signal from the preceding stages and causes tube 100 to conduct heavily, operating a relay 102. This relay then disconnects the sweep portion of the circuit, unclamps the servo-geared motor unit; and lights the "On-Target" lamps, to be described in greater detail below.

During the period when there is no target signal present the range unit searches or sweeps over its time measuring range for such a signal. This searching is accomplished by means of a soft tube saw-tooth oscillator 105 which operates in conventional manner.

The saw-tooth wave output is fed to contacts on three relays and, when the relays are unenergized, through them to the grid of cathode follower tube 82. This in turn causes the voltage applied to the grid of 32A to change directly with the saw-tooth output of 105, thus causing the gates to sweep out in range from zero time (immediately following the blanking pulse to the receiver) to the maximum range which the range unit is capable of measuring (weakest video signal and longest sweep time). The period of the search function is about one-half second.

Relay 102 performs the disconnect functions of the range unit. The figure shows the relay in an unenergized position, that is, its position when there is no target signal present. The range unit should now be searching for a target signal; the saw-tooth voltage from the search circuit is fed to the grid of tube 82 through contacts C of three relays 102, 103, and 104 in series. Normally relays 103 and 104 are not energized so that the search voltage is interrupted by relay 102 only in the presence of a target. When a target is "picked up" the disconnect circuit energizes relay 102 and contact C is disengaged so that the search voltage is removed from the grid of tube 82. 6.3 volts A. C. is applied to the middle arm of relay 102, and when this relay is energized, makes contact with point E, and may light On Target lamps (not represented) on an indicator or intensify an indicator scope. The range voltage from the range unit embodying this invention may be and is often used to feed a follow-up servo (not shown) which produces a mechanical shaft rotation proportional to the voltage input from the range unit and hence proportional to target range. A positive voltage obtained from a 250 volt supply line is applied to contact I of relay 102. When this relay is not energized, the positive voltage is applied through point G to bias off the thyratron tubes (not shown) in a servo-motor control circuit and prevent this circuit from functioning and driving a motor (not shown) in the servo-geared motor unit. During the searching period the motor is thus rendered inoperative and prevents unnecessary wear on the equipment. Thus range information is sent out only when a signal is present and is being tracked; at this time point G is left "floating."

Relays 103 and 104 are In-Out relays which permit the operator to change to another target which he may desire to track. These relays are respectively activated when a target selector switch (not shown) is thrown to either the In or Out position. In addition, operation of either relay breaks the search circuit so that search voltage is not applied to the grid of the cathode follower tube 82. When the In relay 103 is in the unenergized position, condenser 106 charges up to minus 150 volts via contact F. When this relay is energized condenser 106 is applied through point E to the grid of the cathode follower tube 82. This reduces the charge on the integrator capacitor 80, causing the gates to jump off the target in the direction of decreasing range. At the same time point A is switched from the saw-tooth search circuit to resistor 107. This allows the potential on capacitor 80 to decrease, thus causing the gates to sweep slowly in, in range, to the next target after the initial jump from the original target signal. In addition contact I of relay 103 opens the circuit from condenser 109 to ground reducing the time constant of the disconnect circuit and allowing relay 102 to be de-energized quickly. Continued holding down of this relay will cause the gates to sweep in to the end of their range in the event there are no other target signals present. In the event a farther out target is desired, relay 104 is energized by throwing a target selector switch (not shown) to the Out position. In this case, condenser 108 having been charged to plus 250 volts through contact I of relay 104 before it was energized, is now connected to the grid of the cathode follower 82. This immediately adds charge to the integrator capacitor 80 increasing its potential and thus causing the gates to jump out, in range. At the same time, through contact B of relay 104, the grid of tube 82 is connected to a positive potential at the junction of resistors 110 and 111 which allows condenser 80 to charge and slowly increases the potential on the grid of the cathode follower 82. Contact F of relay 104 opens the circuit from condenser 109 to ground and allows relay 102 to be deenergized quickly. As long as relay 104 is energized the gates will slowly increase in range after the initial jump from the original target signal until they reach another target signal farther out in range upon which they will lock. However, if there are no farther targets the gates will sweep to maximum range and eventually disappear for as long as the target selector switch is held in the Out position. Capacitors 106 and 108 supply sufficient jolts to remove the gates from integrator control. Condenser 80 then in the case of "out" direction, or direction of increasing range, is slowly charged, and in the "in" direction, or direction of a decreasing range, is slowly discharged, to search for the next target signal.

Having thus described our invention what we desire to secure by Letters Patent and claim is:

1. In combination, means for radio echo detection of target signals, means for automatically and periodically searching for target signals over the range of said radio echo detection means, means for automatically discontinuing such search upon detection of a target signal, means for automatically range tracking the target signal so detected, means for producing an output voltage directly proportional to the range of a target signal being tracked, means for causing periodic search to resume automatically upon loss of such detected signal and manually controlled means for causing search to proceed in the direction either of lesser range or greater range as desired for the purpose of detecting another target.

2. In a radio echo detection system, an automatic range tracking circuit for producing an output voltage directly proportional to the range of a target, comprising a voltage sensitive precision delay multivibrator having at least an anode, a cathode, and a grid for producing a square wave whose width is dependent upon the potential supplied to said grid, means for producing two narrow gate pulses consecutive in time the first of which occurs at the trailing edge of said square wave, means for causing said gate pulses to search for video signals over the range of said radio echo detection system, coincidence tubes to which said consecutive narrow gate pulses are fed respectively and to each of which video signals from said radio echo detection system are also fed so as to cause heavier conduction through the tube wherein the gate pulse more nearly coincides with said video signal, integrator means for increasing or decreasing a potential according to which of said coincidence tubes conducts heavier, and amplifying means controlled by said integrator potential for producing an output voltage proportional to the time between the leading edge of said square wave and said video signal, a fraction of said output voltage being fed back to said grid of said multivibrator, whereby said gate pulses are caused to track said video signal and whereby said output voltage is maintained in direct proportion to the range of said video signal target.

3. In a radio echo detection system an automatic range tracking circuit system for automatically searching over the range of said radio echo detection system, detecting and selecting a target signal and automatically tracking the same and for producing an output voltage directly proportional to the range of said target, and auxiliary electrical circuits for automatically discontinuing said search upon detection of said signal and auxiliary devices for permitting an operator to select other targets comprising a voltage sensitive precision delay multivibrator having at least a cathode, an anode, and a grid for producing a square wave whose width is dependent upon the potential supplied to said grid, means for producing two narrow gate pulses consecutive in time the first of which occurs at the trailing edge of said square wave, coincidence tubes to which said consecutive narrow gate pulses are fed respectively and to each of which video signals from said radio echo detection system are also fed so as to cause heavier conduction through the tube wherein the gate pulse more nearly coincides with said video signal, integrator means for increasing or decreasing a potential according to which of said coincidence tubes conducts heavier, amplifying means controlled by said integrator potential for producing an output voltage proportional to the time between the leading edge of said square wave and said video signal, a fraction of said output voltage being fed back to said grid of said multivibrator, whereby said gate pulses are caused to track said video signal and whereby said output voltage is maintained in direct proportion to the range of said video signal target, means for generating a sawtooth voltage wave and applying same to said grid of said multivibrator so as to cause said gate pulses to sweep or search over the maximum range of said radio echo detection system, means responsive to a detected signal for disconnecting said sawtooth voltage during the tracking of said signal, and means responsive to manual controls for causing said gate pulses to move to positions corresponding to greater or lesser range respectively.

4. In combination with a radio echo detection system, means associated with said system for automatically range tracking a received target signal, and means for causing said range tracking means to periodically search for target signals over the range of said radio echo detection system.

5. In a radio echo detection system, in combination, means for automatically range tracking a received target signal, means for causing said range tracking means periodically to search for target signals over the range of said system, means for automatically discontinuing such range search upon detection of a signal, and manually controlled means for causing the automatic range search to resume for the purpose of detecting other target signals.

6. In a radio echo detection system, in combination, a generator of two consecutive narrow gate pulses, means for periodically scanning said two consecutive gate pulses over the range of said radio detection system, and means for automatically discontinuing said gate pulse scanning upon coincidence in time of said gate pulses and an echo signal detected by said system.

7. In a radio echo detection system utilizing a voltage sensitive double gate pulse generator for automatic range tracking, means for scanning the range of said system comprising, a generator for providing sawtooth waves, and means for applying said sawtooth waves to said double gate pulse generator to vary the time of occurrence of said double gate pulses.

8. In combination with a radio echo detection system, means for automatic discovery and range tracking of a detected target comprising, a generator for producing double consecutive gate pulses at times determined by the magnitude of voltages applied to said generator, a sawtooth wave generator, means for applying the output of said sawtooth wave generator to said double consecutive gate pulse generator for varying the time of generation of said double gate pulses, means responsive to simultaneous occurrence of said gate pulses and a detected target signal for disconnecting said sawtooth wave generator from said double gate pulse generator, and means responsive to relative overlapping of said target signal and each of said gate pulses for providing operating voltages to said double gate pulse generator to maintain said double gate pulses in an overlapping relationship with said target signal.

9. In combination with a radio echo detection system, means for automatic discovery and range tracking of a detected target comprising, a voltage sensitive square wave generator for producing a square wave of duration determined by voltages applied thereto, means for generating double consecutive gate pulses, the first of said gate pulses coinciding in time with the trailing edge of said square wave, a pair of coincidence circuits to which said gate pulses are respectively applied, means for applying echo signals to said coincidence circuits, the coincidence circuit wherein the gate pulse more nearly coincides in time with said echo pulse conducting more heavily than the other of said coincidence circuits, means for separately integrating the outputs of said coincidence circuits, means for applying the outputs of said integrating means to said square wave generator to control the duration of said square waves thereby maintaining said double gate pulses in substantially equal overlapping relationship with said echo signal, means for generating and applying a sawtooth wave to said square wave generator in the absence of echo signals and means for disconnecting said sawtooth wave generator from said square wave generator upon the simultaneous application of an echo signal and said gate pulses to said coincidence circuits.

10. In a radar system adapted to radiate into space a pulse of electromagnetic energy and to intercept a portion of said energy reflected from a target, a time measuring unit comprising, means for producing a gate pulse having adjustable time relation to said radiated pulse, searching means comprising a relaxation oscillator coupled to said gate pulse producing means for periodically sweeping the time relation of said gate between limits corresponding to predetermined minimum and maximum intervals delayed from said radiated pulse, tracking means jointly responsive to said gate pulse and a reflected energy signal for maintaining said gate pulse substantially in time coincidence with a reflected energy signal, and means responsive to the average value of said reflected energy signal for actuating said relaxation oscillator to render said searching means inoperative and said tracking means operative.

11. In a radar set having an automatic range tracking circuit of the type in which the time of occurrence of a pair of consecutive "early" and "late" gate pulses generated a variable time after the radiation of each search pulse is regulated to straddle a selected target pulse detected by said radar set, means responsive to a lack of time coincidence between a selected target pulse and one of said gate pulses for cyclically varying the time of occurrence of said "early" and "late" gate pulses over the range of said radar set and means for rendering said last-mentioned means inoperative as soon as a target pulse coincides in time with a portion of both of said "early" and "late" gate pulses.

12. In a radar set having an automatic range tracking and searching circuit, the combination of first and second multielectrode coincidence tubes, each tube being biased to cutoff and requiring the conjoint presence of positive pulses on a pair of its control electrodes for conduction, means for coupling positive target pulses detected by said radar set to a first control electrode of each tube, means for generating a pair of consecutive positive gate pulses a variable time after the radiation of each search pulse from said radar set, means for coupling the first of said gate pulses to a second control electrode of said first tube and the second of said consecutive gate pulses to a second control electrode of said second tube whereby said tubes are rendered conducting whenever a target pulse coincides in time with one of said consecutive gate pulses and whereby control pulses having a duration corresponding to the degree of overlap are produced in the output circuit of said tubes, means responsive to the failure of said tubes to produce control pulses for cyclically varying the time of occurrence of said consecutive positive gate pulses over the range of said radar set and means for rendering said last-mentioned means inoperative as soon as an output pulse is produced by one of said coincidence tubes.

References Cited in the file of this patent

UNITED STATES PATENTS

| | | |
|---|---|---|
| 1,924,174 | Wolf | Aug. 29, 1933 |
| 2,247,662 | Newhouse | July 1, 1941 |
| 2,399,426 | Bradley | Apr. 30, 1946 |
| 2,433,667 | Hollingsworth | Dec. 30, 1947 |
| 2,433,681 | Blumlein | Dec. 30, 1947 |
| 2,455,265 | Norgaard | Nov. 30, 1948 |
| 2,467,208 | Hahn | Apr. 12, 1949 |
| 2,495,753 | Mozley | Jan. 31, 1950 |
| 2,538,027 | Mozley et al. | Jan. 16, 1951 |
| 2,566,331 | Huber et al. | Sept. 4, 1951 |
| 2,737,652 | White et al. | Mar. 6, 1956 |

FOREIGN PATENTS

| | | |
|---|---|---|
| 455,765 | Great Britain | Oct. 27, 1936 |